(12) United States Patent
Brindley et al.

(10) Patent No.: US 12,417,492 B2
(45) Date of Patent: Sep. 16, 2025

(54) IDENTITY PROVIDER SELECTION FOR IDENTITY ATTRIBUTE SHARING PROCESS

(71) Applicant: Early Warning Services, LLC, Scottsdale, AZ (US)

(72) Inventors: Dougal Brindley, Alameda, CA (US); Gregory Slowiak, Chicago, IL (US)

(73) Assignee: Early Warning Services, LLC, Scottsdale, AZ (US)

( * ) Notice: Subject to any disclaimer, the term of this patent is extended or adjusted under 35 U.S.C. 154(b) by 304 days.

(21) Appl. No.: 17/984,106

(22) Filed: Nov. 9, 2022

(65) Prior Publication Data

US 2023/0064412 A1 Mar. 2, 2023

Related U.S. Application Data

(63) Continuation-in-part of application No. 17/716,516, filed on Apr. 8, 2022, now Pat. No. 11,847,694, (Continued)

(51) Int. Cl.
*G06Q 40/03* (2023.01)
*G06F 9/445* (2018.01)
*G06F 21/30* (2013.01)
*G06F 21/62* (2013.01)
*H04L 9/08* (2006.01)
(Continued)

(52) U.S. Cl.
CPC ............. *G06Q 40/03* (2023.01); *G06F 9/445* (2013.01); *G06F 21/305* (2013.01); *G06F 21/6263* (2013.01); *H04L 9/0819* (2013.01); *H04L 41/147* (2013.01); *H04L 63/0876* (2013.01); *H04L 63/0884* (2013.01); *H04L 63/126* (2013.01); *H04L 67/535* (2022.05)

(58) Field of Classification Search
CPC .. G06Q 40/03; G06Q 40/6263; H04L 9/0819; H04L 9/0884; H04L 9/126
See application file for complete search history.

(56) References Cited

U.S. PATENT DOCUMENTS 10,255,598 B1 4/2019 Dean et al.
2017/0171200 A1* 6/2017 Bao .................. H04L 9/3213
(Continued)

FOREIGN PATENT DOCUMENTS

WO 2019118682 A1 6/2019

OTHER PUBLICATIONS

Notice of Allowance issued in U.S. Appl. No. 17/716,516, dated Aug. 2, 2023 in 10 pages.

*Primary Examiner* — Scott C Anderson
(74) *Attorney, Agent, or Firm* — Kilpatrick Townsend & Stockton LLP

(57) ABSTRACT

Methods of selecting an identity provider using an identity attribute sharing system may include accessing, by a user device, a page of a relying party. The methods may include receiving, by the user device, a selection to utilize an identity network to share a number of identity attributes with the relying party. The methods may include displaying, by the user device, a plurality of identity providers enrolled for use with the identity attribute sharing system. The methods may include receiving, by the user device, a selection of one of the plurality of identity providers. The methods may include providing access to a page of a selected identity provider.

14 Claims, 10 Drawing Sheets

Related U.S. Application Data which is a continuation of application No. 16/908,460, filed on Jun. 22, 2020, now Pat. No. 11,328,356.

(60) Provisional application No. 63/277,846, filed on Nov. 10, 2021, provisional application No. 62/864,900, filed on Jun. 21, 2019, provisional application No. 62/864,911, filed on Jun. 21, 2019, provisional application No. 62/864,889, filed on Jun. 21, 2019, provisional application No. 62/864,891, filed on Jun. 21, 2019, provisional application No. 62/864,906, filed on Jun. 21, 2019.

(51) Int. Cl.
*H04L 9/40* (2022.01)
*H04L 41/147* (2022.01)
*H04L 67/50* (2022.01)

(56) References Cited

U.S. PATENT DOCUMENTS

| | | | |
|---|---|---|---|
| 2017/0221064 A1* | 8/2017 | Turgeman | H04W 12/06 |
| 2018/0075502 A1* | 3/2018 | Dika | G06F 16/90335 |
| 2019/0182042 A1 | 6/2019 | Ebrahimi et al. | |
| 2019/0190898 A1* | 6/2019 | Cui | H04L 67/75 |

* cited by examiner

IDENTITY PROVIDER SELECTION FOR IDENTITY ATTRIBUTE SHARING PROCESS

CROSS-REFERENCE TO RELATED APPLICATIONS

This application claims the benefit of priority to U.S. Provisional Application No. 63/277,846 by Brindley et al., entitled "IDENTITY PROVIDER SELECTION FOR IDENTITY ATTRIBUTE SHARING PROCESS," filed Nov. 10, 2021. This application is a continuation-in-part of U.S. patent application Ser. No. 17/716,516 by Slowiak et al., issued as U.S. Pat. No. 11,847,694, entitled "DIGITAL IDENTITY LOCK," filed Apr. 8, 2022, which is a continuation of U.S. patent application Ser. No. 16/908,460 by Slowiak et al., issued as U.S. Pat. No. 11,328,356, entitled "DIGITAL IDENTITY LOCK," filed Jun. 22, 2020, which claims the benefit of priority to: U.S. Patent Application No. 62/864,891 by Woodward et al., entitled "DIGITAL IDENTITY," filed Jun. 21, 2019; U.S. Patent Application No. 62/864,900 by Woodward et al., entitled "DIGITAL IDENTITY SIGN-UP," filed Jun. 21, 2019; U.S. Patent Application No. 62/864,906 by Woodward et al., entitled "DIGITAL IDENTITY SIGN-IN," filed Jun. 21, 2019; U.S. Application No. 62/864,911 by Woodward et al., entitled "DIGITAL IDENTITY STEP-UP," filed Jun. 21, 2019; and U.S. Patent Application No. 62/864,889 by Woodward et al., entitled "DIGITAL IDENTITY LOCK," filed Jun. 21, 2019, each of which is incorporated by reference herein in its entirety.

BACKGROUND

Most companies have an online presence today and each has information about each of its users and customers. However, authentication of a user is largely handled piecemeal by each company with little verification of the user by a trusted source. The current way that users are onboarded and authenticated lacks security, consistency, and ease of use for both the companies and the users. Additionally, current methods to perform identity verification online have considerable drawbacks in coverage, validity, and usability.

SUMMARY

Figure 1:
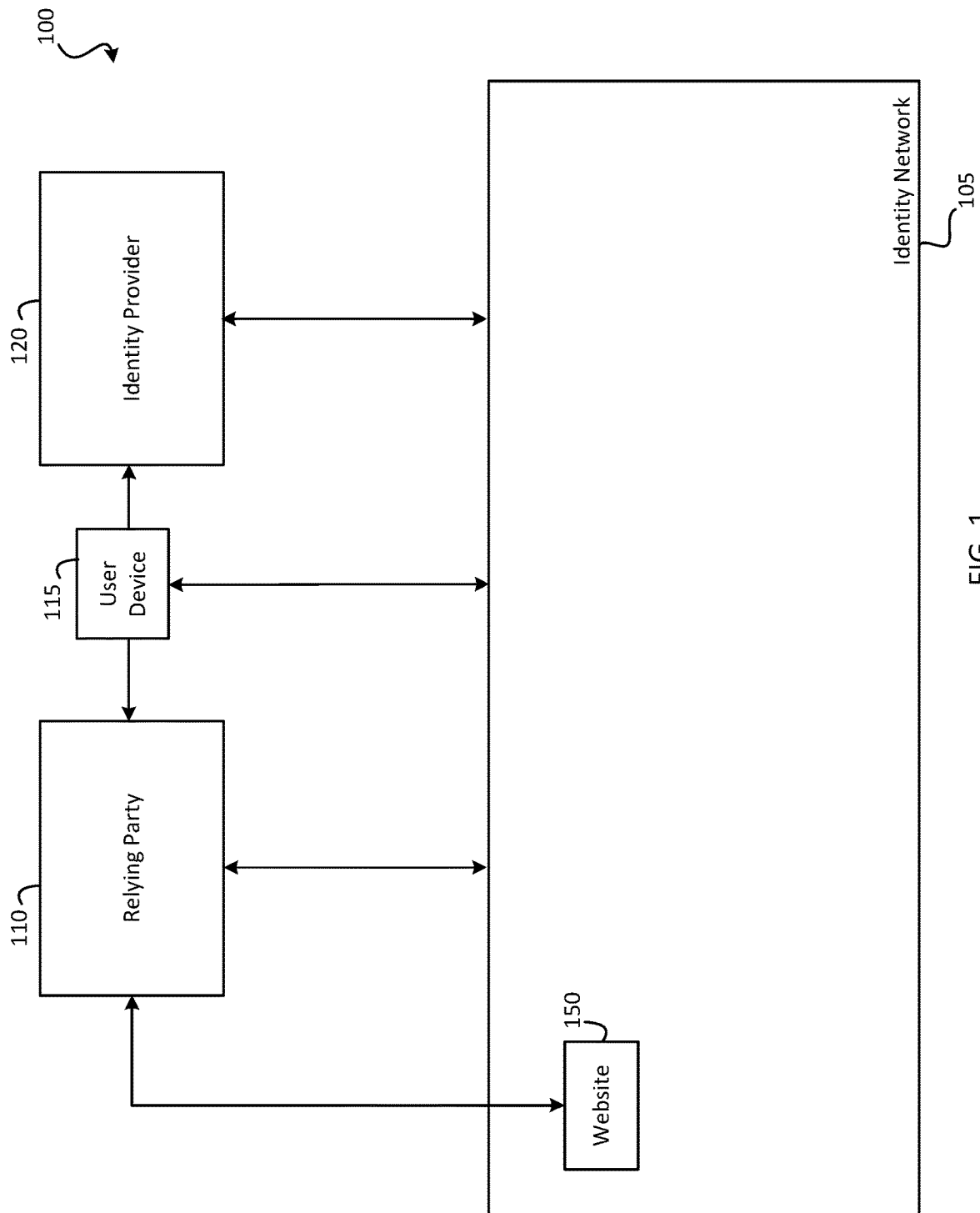
FIG. 1 illustrates an example system for providing an authenticated, universal digital identity for a user, according to an embodiment.

Embodiments of the present technology are directed to systems and methods for enabling users to select a trusted identity provider for sharing identity attributes to sign up for and/or login to a website and/or mobile application of a relying party. Embodiments leverage the relationship between the user and the trusted identity provider (such as a bank or other financial institution), as well as banking regulations, to provide secure techniques for a relying party to authenticate an identity of a digital user.

One aspect of the disclosure provides for a method of selecting an identity provider using an identity attribute sharing system, the method comprising, using a user device associated with a user, accessing a page of a relying party, receiving a selection to utilize an identity network to share a number of identity attributes with the relying party, displaying a plurality of identity providers enrolled for use with the identity attribute sharing system, receiving a selection of one of the plurality of identity providers, and providing access to a page of a selected identity provider. Providing access to the page of the selected identity provider may comprise receiving a selection of a web link that navigates a browser of the user device to a login page of the selected identity provider. Providing access to the page of the selected identity provider may comprise receiving a selection of an application link that launches a mobile application associated with the selected identity provider. Providing access to the page of the selected identity provider comprises presenting a QR code associated with the selected identity provider. The method may further comprise receiving an indication from another user device that scanned the QR code that consent was provided to share the number of identity attributes. The identity attributes may include at least one of the user's name, address, phone number, email address, gender, birthdate, peer to peer payment network token. The method may further comprise presenting a list of the number of identity attributes and receiving an indication that consent was provided to share the number of identity attributes with the relying party. The method may further comprise, upon receiving the indication of consent, sending a confirmation of the consent to the identity network to share the number of identity attributes with the relying party and redirecting to an additional page of the relying party.

A further aspect of the disclosure provides for a non-transitory computing-device readable storage medium on which computing-device readable instructions of a program are stored, the instructions, when executed by one or more computing devices, causing the one or more computing devices to perform a method, comprising accessing a page of a relying party, receiving a selection to utilize an identity network to share a number of identity attributes with the relying party, displaying a plurality of identity providers enrolled for use with the identity attribute sharing system, receiving a selection of one of the plurality of identity providers, and providing access to a page of a selected identity provider. Providing access to the page of the selected identity provider may comprise receiving a selection of a web link that navigates a browser of the user device to a login page of the selected identity provider. Providing access to the page of the selected identity provider may comprise receiving a selection of an application link that launches a mobile application associated with the selected identity provider. Providing access to the page of the selected identity provider may comprise presenting a QR code associated with the selected identity provider. The method may further comprise receiving an indication from another user device that scanned the QR code that consent was provided to share the number of identity attributes. The identity attributes may include at least one of the user's name, address, phone number, email address, gender, birthdate, peer to peer payment network token. The method may further comprise presenting a list of the number of identity attributes and receiving an indication that consent was provided to share the number of identity attributes with the relying party.

A further aspect of the disclosure provides for a system, comprising one or more computing devices, and memory storing instructions, the instructions being executable by the one or more computing devices, wherein the one or more computing devices are configured to access a page of a relying party, receive a selection to utilize an identity network to share a number of identity attributes with the relying party, display a plurality of identity providers enrolled for use with the identity attribute sharing system, receive a selection of one of the plurality of identity providers, and provide access to a page of a selected identity provider. Providing access to the page of the selected identity provider comprises receiving a selection of at least one of a web link that navigates a browser of the user device to a login page of the selected identity provider or an application link that launches a mobile application associated with the selected identity provider. Providing access to the page of the selected identity provider may comprise presenting a QR code associated with the selected identity provider. The method may further comprise receiving an indication from another user device that scanned the QR code that consent was provided to share the number of identity attributes. The method may further comprise presenting a list of the number of identity attributes and receiving an indication that consent was provided to share the number of identity attributes with the relying party.

A further aspect of the disclosure provides for a method of authenticating an identity of a user, the method comprising, using an identity network, providing a number of identity providers to a user device associated with the user, receiving a selection of an identity provider of the identity providers from the user device, receiving a number of identity attributes from the selected identity provider, and providing at least some of the identity attributes to the relying party. The method may further comprise after receiving the selection of the identity provider, directing the user device to a page of the identity provider. The method may further comprise, prior to providing the at least some of the identity attributes to the relying party, providing a consent request to the user device to share the identity attributes, and receiving a consent approval to share the identity attributes with a relying party. Providing the consent request to the user device may include providing the identity attributes to the user device for display. The method may further comprise receiving a request for particular identity attributes from the relying party and providing the at least some of the identity attributes to the relying party may include providing the particular identity attributes requested by the relying party.

A further aspect of the disclosure provides for a method of authenticating an identity of a user, the method comprising, using a relying party receiving a first set of identity attributes from the user device, receiving a second set of identity attributes from a identity network, comparing the first and second set of identity attributes to determine whether to provide access to the user device to the access-controlled portion of the website, and providing the user device access to the access-controlled portion of the website of the relying party based on the comparison. The method may further comprise requesting particular identity attributes from the identity network and receiving the number of identity attributes may include receiving the particular identity attributes. The first set of identity attributes may be received prior to the second set of identity attributes and the method may further comprise storing the second set of identity attributes. Comparing the first and second set of attributes may include determining whether the first and second sets of identity attributes match. The relying party may provide the user device access to the access-controlled portion of the website of the relying party when the first and second sets of identity attributes match. Prior to providing the user device access, the relying party may deny access to the user device to the access-controlled portion of the website of the relying party when the first and second sets of identity attributes do not match. The first set of identity attributes may be entered in a set of data fields and the method may further comprise providing an indication as to which of the data fields include identity attributes that do not match the second set of identity attributes, receiving a third set of identity attributes entered by the user including changes to an entry of the indicated data fields, and comparing the second and third sets of identity attributes to determine whether to provide access to the user device to the access-controlled portion of the website.

DETAILED DESCRIPTION

The explosion of online user activity and data over the past decades have resulted in a disparate system in which most online companies have developed their own systems for users to sign-up, sign in, and utilize their services. Authentication of users is often difficult to ensure that online identity theft and other sinister activities are avoided. Further, the process for creation of new accounts and tracking of countless passwords for users is tedious.

To solve the problem of invalid authentication and password security for users, described herein is a system for utilizing identity attributes of a user known to a trusted identity provider (such as a bank or other financial institution) that a user may use to create new accounts and log into existing accounts with relying parties of the system. The identity network allows a user to sign up with a relying party using identity attributes from an identity provider and solves the technical problem faced by many online companies related to authentication of digital users. For example, online companies may require that a user provide information to create an account. However, the company has no way to verify or authenticate the new user. Companies cannot be sure that existing users are verified other than through their own password systems, which suffer from password theft issues and invalid initial sign up. Accordingly, the technical solution described herein provides a consistent and technical way for the company to authenticate the user using a universal online digital identity.

Users often have a trusted relationship with their banks, and banks are regulated so certain precautions are taken by banks to ensure the user is a legitimate and authenticated user. Banks and other providers that have regulated processes for identifying users may be used to authenticate users with a digital identity authentication and provide information on the users for relying parties by becoming an identity provider in the disclosed identity network. Relying parties, such as insurance companies, retailers, and so forth can enroll with the identity network to gain the benefit of the regulated user identification procedures of the identity provider authenticating the digital identity of users and customers and providing verified identity attributes upon account sign-up for a new customer. The identity network can broker authentication and information exchange using cryptographic technology and other verifiable methods between the relying party and the identity provider. Additional technological value can be provided by the identity network by overseeing and identifying suspicious activity overall for a device or user, obtaining information from various third parties for the relying party to further validate the user, and so forth.

FIG. 1 illustrates an example digital identity system 100 for utilizing identity attributes of a user known to a trusted identity provider to sign up for and/or log into accounts with relying parties. System 100 includes an identity network 105, a relying party 110, a user device 115, and an identity provider 120. Components or functionality described may be combined into fewer components or expanded into more components without departing from the scope of the present application.

The identity network 105 may include a network of one or more computers, such as computing device 600 shown in FIG. 6, as described below. The identity network 105 may include a website 150. The identity network 105 may include other components or functionality than discussed, or may include components combined into fewer or more components without departing from the scope of the present application. The identity network 105 provides the functionality to broker the authentication and information exchange between the relying party 110 and the identity provider 120, as discussed in more detail herein.

The website 150 may be an internet interface provided by the identity network 105 that the relying party 110 may use to redirect the end user, for example, to select their identity provider 120 when a request is initiated. The website 150 may redirect the user to their identity provider 120 website or mobile application via a matrix barcode (e.g., a QR code), an application link, a website link, or via a short message service (SMS) or mobile push notification. In some embodiments, the relying party 110 may include a software development kit from the identity network 105 that is used to redirect the user to the website 150 to select the user's identity provider 120 when a request is initiated.

The relying party 110 may include one or more computing devices of any company or entity that would like to be able to authenticate the digital identity of a user. Examples of relying parties 110 include insurance companies, retailers, travel companies (e.g., airlines, hotels, cruise lines), utility companies, and the like. While only a single relying party 110 is depicted in FIG. 1 for the sake of simplicity of explanation, any number of relying parties 110 may be included in system 100.

Figure 6:
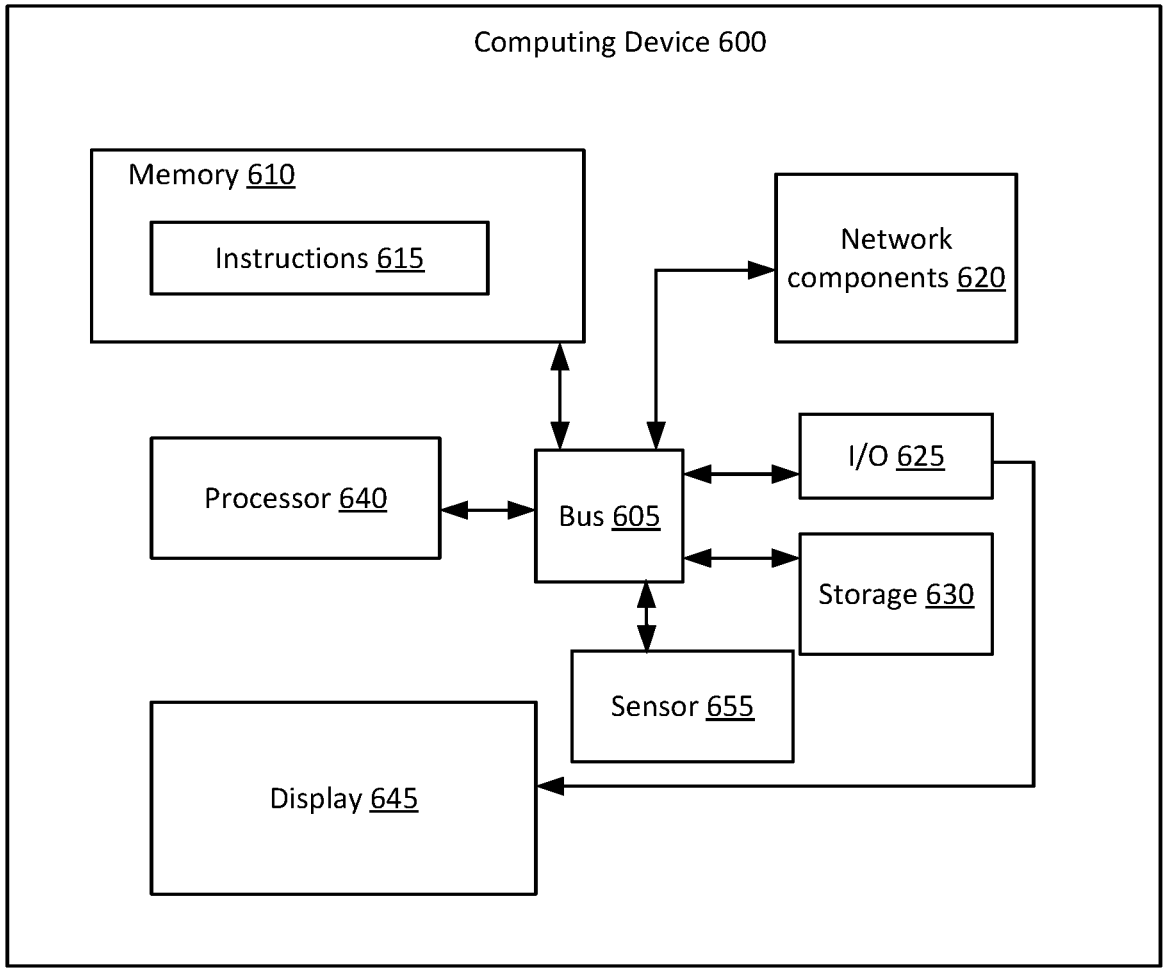
FIG. 6 illustrates an example computer system.

The user device 115 may be any suitable computing device, such as computing device 600, as depicted and described with respect to FIG. 6, of a user. For example, the user device 115 may be a laptop, smartphone, desktop computer, tablet, smartwatch, and the like. While only a single user device 115 is depicted in FIG. 1 for the sake of simplicity of explanation, any number of user devices 115 may be included in system 100.

The identity provider 120 may include one or more computing devices of any suitable company that can authenticate a user (having user device 115) for the relying party 110. The identity provider 120 may include, for example, banks and/or other financial institutions. The identity provider 120 may have detailed information regarding the identity of the user and may have previously verified the identity of the user of user device 115 because, for example, financial institutions are regulated by the government with respect to identifying customers with specificity. In this manner, the identity providers 120 may be relied upon to have accurately verified the identity of the user of user device 115. While only a single identity provider 120 is depicted in FIG. 1 for the sake of simplicity of explanation, any number of identity providers 120 may be included in system 100.

In use, a user may access a relying party 110 website 150 using the user device 115 to sign up with the relying party 110. For example, the user may wish to initiate a new relationship with the relying party 110 to, for example, become a customer of the relying party 110. The relying party 110 may request digital identity authentication and information for the user of the user device 115 from the identity network 105 via website 150. In some embodiments, the user device 115 may access a mobile application and/or website 150 of the relying party 110. The mobile application may access website 150 with an identity assertion to the relying party 110 to access an access-controlled portion of the website 150. The identity assertion may be a request to authenticate the digital identity of the user and, in some cases, request additional information about the user.

In response, the relying party 110 may direct the user device 115 to a page of the identity network 105 on the website 150. On that page, the identity network 105 may provide one or more identity providers 120 for the user to select for authenticating the user's digital identity. For example, the identity network 105 may provide a list including many identity providers 120, and the user may select an identity provider with which the user has a relationship with. For example, if the user is a customer of BankA, and BankA is provided by the website as an identity provider in a list of identity providers, the user may select BankA as the identity provider for authenticating that user's digital identity. If the user has a relationship with multiple identity providers 120, the user may select any one of the identity providers 120 with which the user has a relationship.

Once the user selects an identity provider 120, the identity network 105 may direct the user to a page of the selected identity provider 120 (e.g., a login page). On the page of the identity provider 120, the user may be presented with a login page associated with the selected identity provider 120. The user may enter login credentials to be authenticated at the selected identity provider 120. The selected identity provider 120 may verify the login credentials entered by the user to authenticate the user using various authentication techniques. For example, the identity provider 120 may offer single and/or multi-factor authentication methods in some embodiments to verify the login credentials entered by the user (e.g., by comparing the entered login credentials against a stored list of login credentials associated with the user and/or providing a verification code to a trusted device of the user for the user to confirm with the identity provider 120). Based on these authentication techniques, the identity provider 120 may indicate that the identity of the user has been authenticated. If the identity provider 120 fails to authenticate the identity of the user, the identity provider 120 may notify the identity network 105 that the user's identification has not been verified. Alternatively or additionally, the identity provider 120 may simply not let the user progress further with the authentication process, as described below.

Figure 3A:
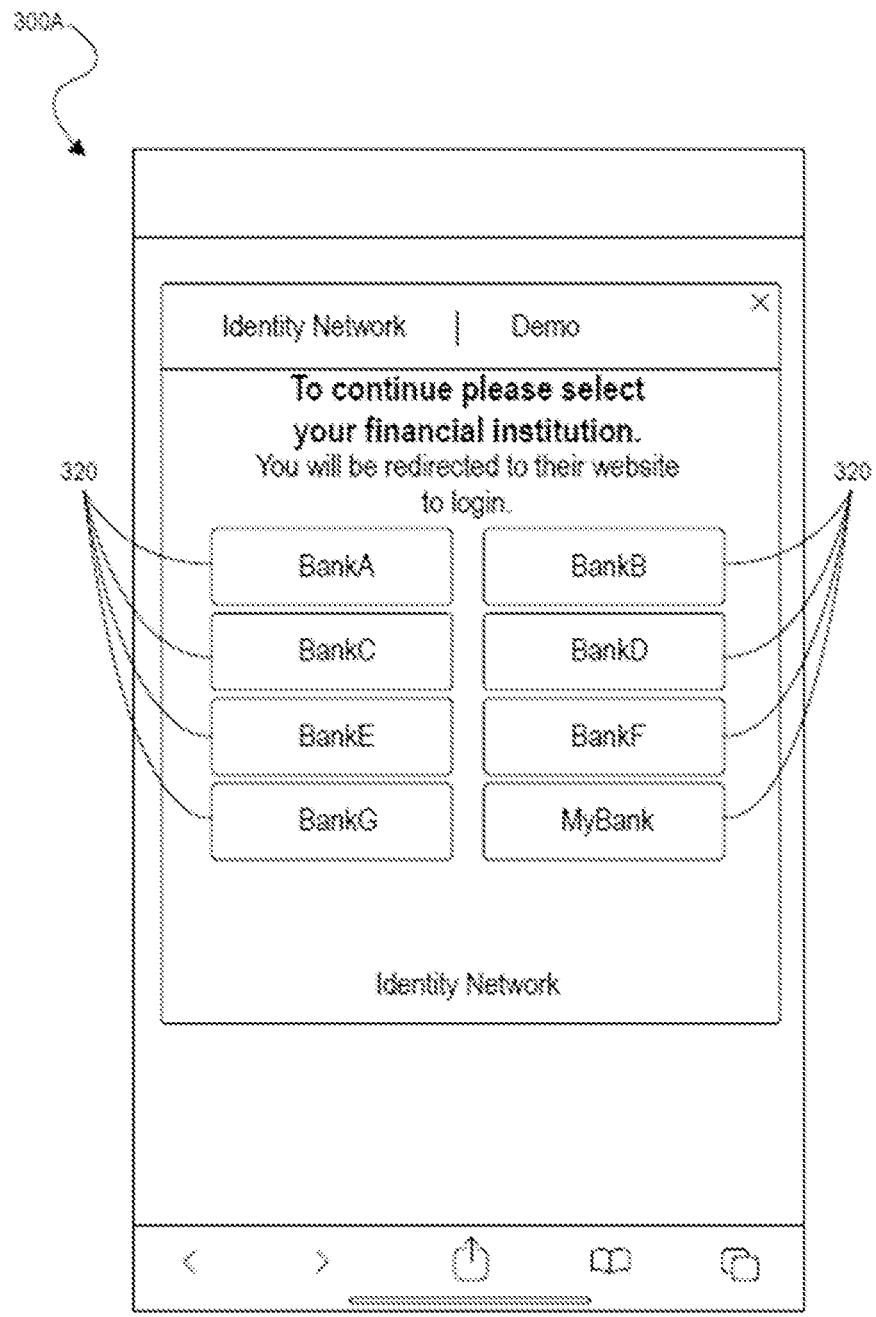
FIGS. 3A-3C illustrate screenshots of a user interface for selecting an identity provider during an identity attribute sharing/matching process according to an embodiment.
Figure 3B:
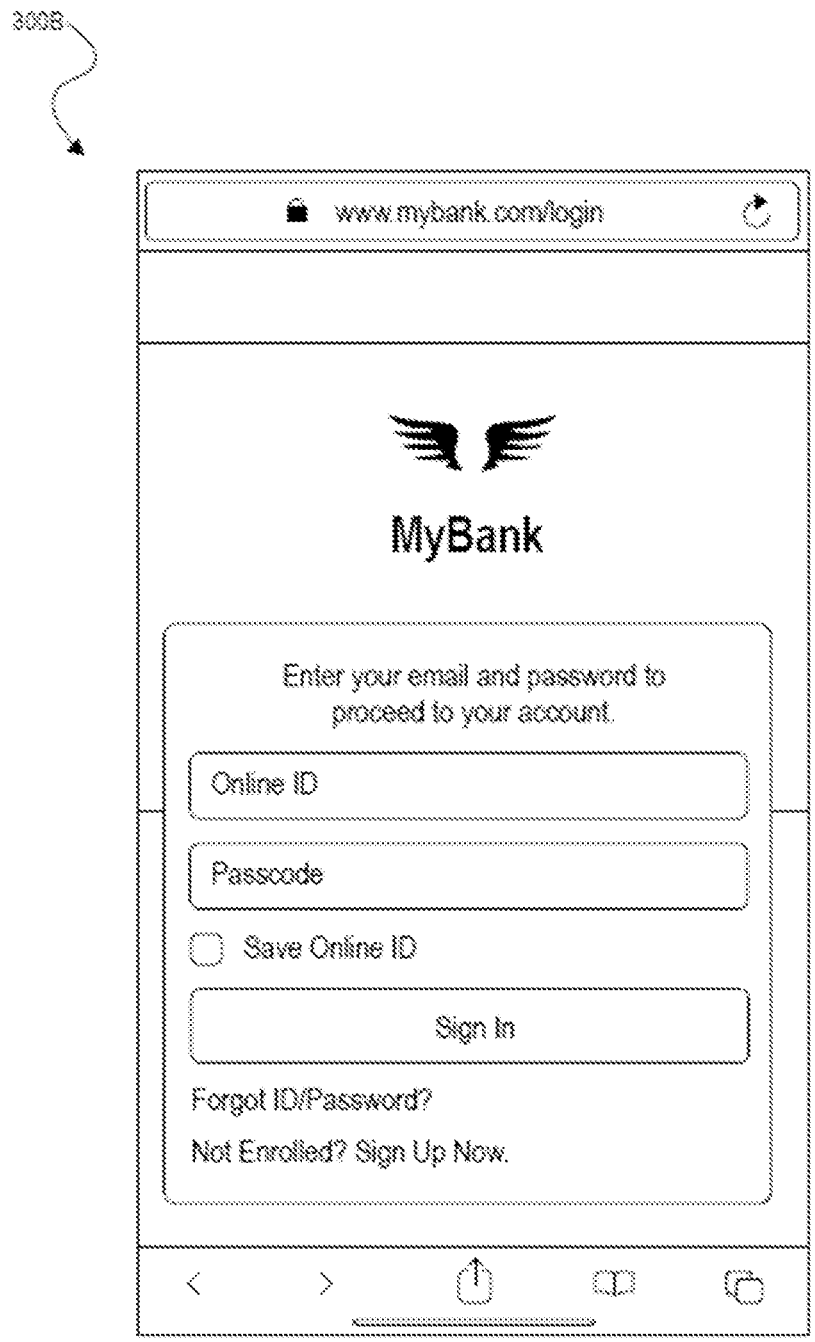
Figure 3C:
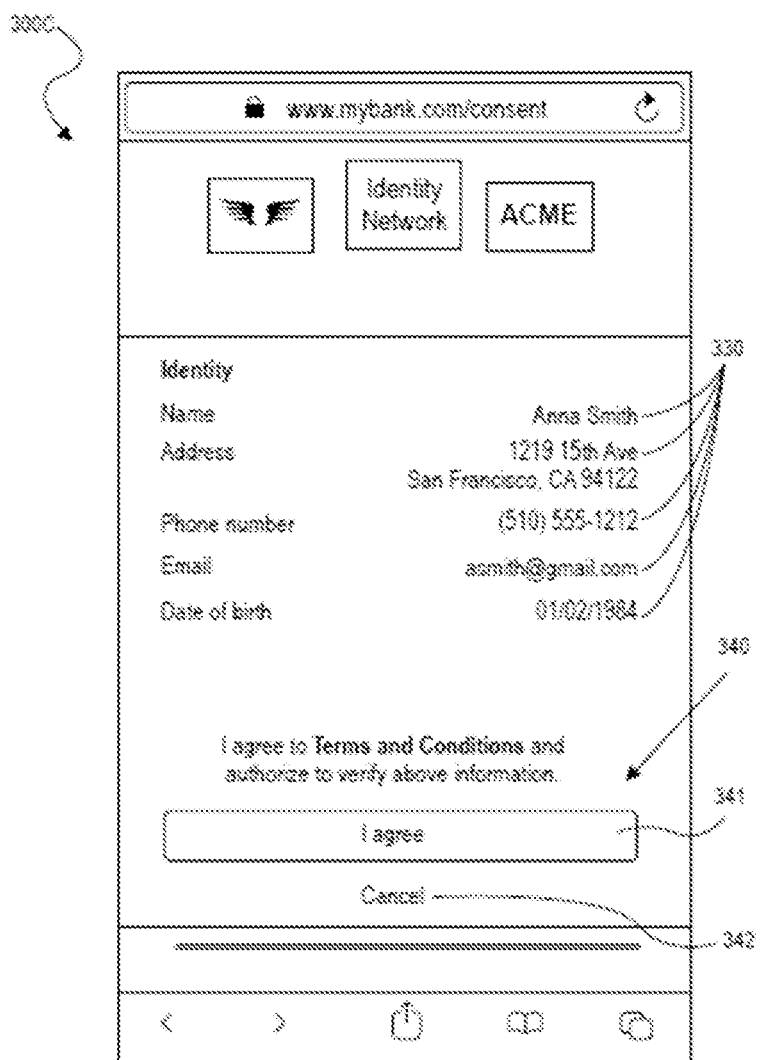

Upon successful authentication of the user, the selected identity provider 120 may provide a number of identity attributes of the user to the identity network 105. The identity attributes may include, for example, the user's name, address, phone number, email address, gender, birthdate, peer to peer payment network token, and/or other identifying information. The identity attributes may be presented to the user by the identity network 105 on a confirmation page of the identity network 105. The confirmation page of the identity network 105 may be hosted on the website 150 or may be hosted on a page of the selected identity provider 120 (e.g., the confirmation page 300C, as shown in FIG. 3C). The user may review the identity attributes and may submit a consent approval to the identity network 105 to share the identity attributes with the relying party 110. However, in other embodiments, the identity attributes may be shared directly by the identity provider 120 with the relying party 11. In some embodiments, only those particular identity attributes requested by the relying party 110 may be provided by the identity network 105. Upon receiving the consent approval, the identity network 105 may redirect the user back to the relying party's website 150.

Once the user's identity attribute(s) have been provided to the relying party 110 by the identity network 105, the relying party 110 may utilize the shared identity attributes to authenticate the user's identity in the future. For example, the website 150 of the relying party 110 may present the user with a number of data fields in which to enter the user's identity attributes. The user may enter identity attributes in those data fields. The relying party 110 may store those provided identity attributes for use at a later step in the authentication process. Once the user has provided the identity attributes in the data fields, the user may be provided with a list of identity providers 120 (which may be the same or different from the list of identity providers 120 previously provided to the user). The user may select an identity provider 120 with which the user has already provided consent to share identity attributes, such as BankA. Once the user selects an identity provider 120, the user may be presented with a login page associated with the selected identity provider 120. The user may enter login credentials to be authenticated at the selected identity provider 120, which the selected identity provider 120 may verify, as discussed above.

Upon successful authentication of the user, the selected identity provider 120 may provide a number of identity attributes to the identity network 105 for presentation to the user on a confirmation page of the website 150 for the identity network 105. The user may review the identity attributes and consent to the identity network 105 sharing the identity attributes with the relying party 110. These identity attributes may then be shared with the relying party 110. The relying party 110 may then compare the set of identity attributes directly supplied by the user on the website 150 with those supplied by the identity provider 120 via the identity network 105 to determine whether the sets of identity attributes match. In some embodiments, only those identity attributes requested by the relying party 110 may be provided by the identity network 105.

The identity network 105 may redirect the user back to the relying party's website 150 to see the results of the comparison. If the relying party 110 determines that the identity attributes match, the relying party 110 may provide access to the user device 115 to access an access-controlled portion of the relying party's website 150. If the relying party 110 determines that the identity attributes do not match, the relying party 110 may provide a notification to the user device 115 that the user is not allowed access to the access-controlled portion of the relying party's website 150. Alternatively, if the relying party 110 determines that the identity attributes do not match, the relying party 110 may provide an indication to the user device 115 which of the data fields include identity attributes that do not match the identity attributes provided by the identity network 105 (e.g., the data fields may be highlighted or point at by an arrow, or the like). This may allow the user to change the indicated data fields to a different identity attribute that may match the first set of identity attributes. After this change, the relying party 110 may compare the sets of identity attributes again and, if the relying party 110 determine those sets match, the relying party 110 may provide the user device 115 with access to the access-controlled portion of the website 150.

The identity attributes may be placed into data bundles for relying parties 110 to request. The data bundles may be requested from identity providers 120 as scope bundles and/or individual claims.

Figure 2:
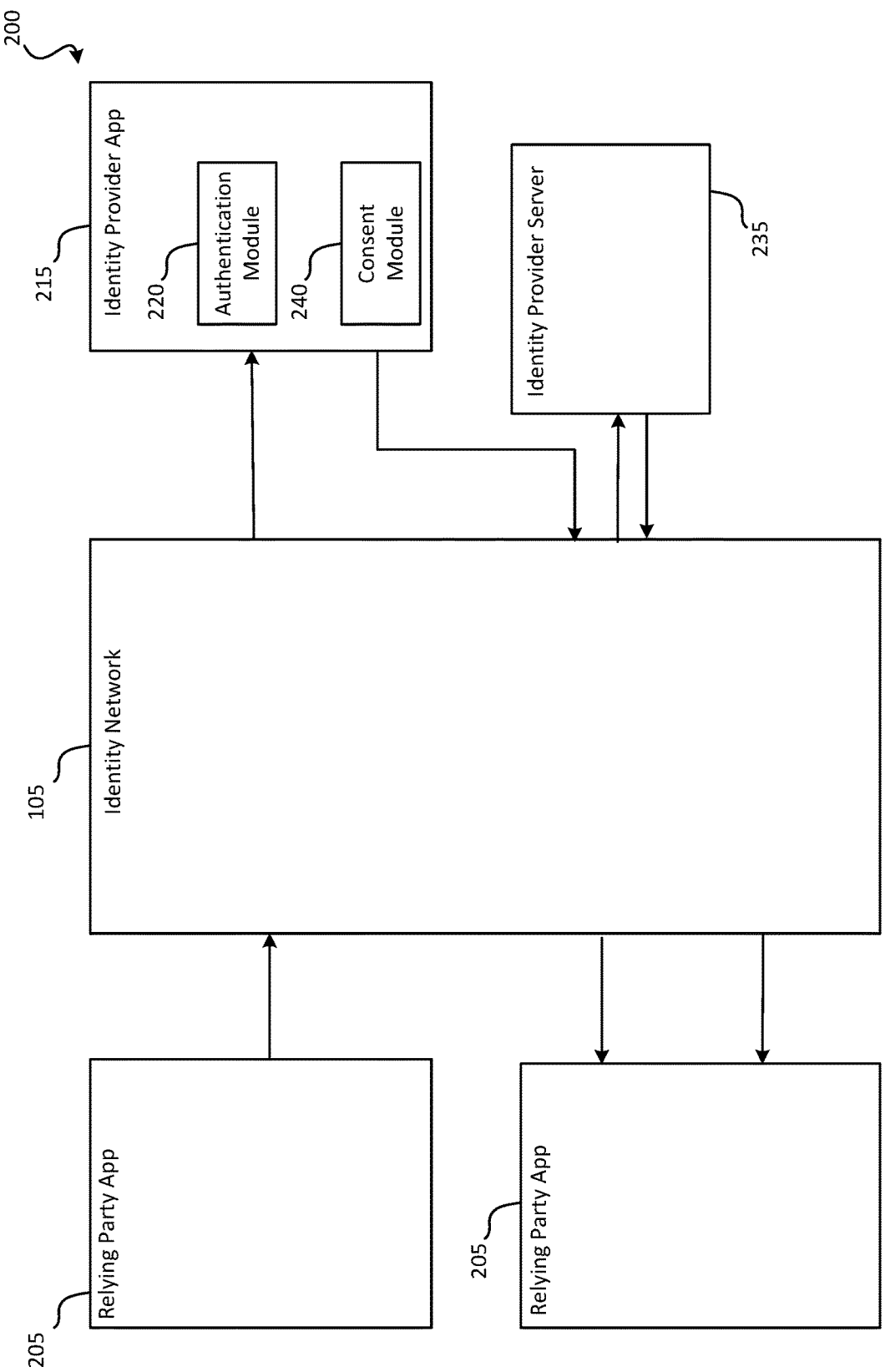
FIG. 2 illustrates an example data information flow using an authenticated, universal digital identity for a user, according to an embodiment.

FIG. 2 illustrates an example data flow 200 of data through a digital identity system. The data flow 200 includes the relying party application 205, the identity network 105, the identity provider application 215, and the identity provider server 235. The identity provider application 215 and the identity provider server 235 collectively are included in the identity provider 120 as described with respect to FIG. 1. Starting with the relying party application 205, associated with the relying party 110, the user may decide to sign-up for access to the relying party using the user's digital identity. In response, the relying party 110 may send a request to the identity network 105 to authenticate the user's identity. In some embodiments, the identity network 105 may provide a list of identity providers for the user to select from.

Once the identity provider 120 is selected, the identity network 105 may generate a token to associate the selected identity provider 120 with the user. This token may be stored in the identity network 105 to be used in the future by to expedite the authentication process. In particular, future requests to authenticate the user may include identifying the token associated with the user for the selected identity provider. Once the token is identified, the identity network 105 may look up the identity provider 120 associated with the token and launch the identity provider application 215 to the user, as discussed further below, without requiring the user to select form the list of identity providers 120. In some embodiments, the identity provider 120 may provide the token upon first request by the identity network 105 to authenticate the user with the identity provider 120.

The identity network 105 may generate a session ID and may provide the session ID to the relying party application 205. The session identifier may be used throughout the process to track the activity associated with the initial request from the relying party application 205 for the specific user.

Once the identity provider 120 is selected (or where the identity network 105 identifies a previously selected identity provider 120 associated with a token that is associated with the user), the identity provider application 215 corresponding to the selected identity provider 120 may be provided to the user. In some embodiments, where the user selects the identity provider 120, selecting the identity provider 120 may include selecting an application link (such as a deep link) associated with the identity provider application 215 to launch the identity provider application 215. The application link may include the session identifier generated by the identity network 105.

In the identity provider application 215, the user logs into their account and is subsequently authenticated with authentication module 220. For example, the identity provider 120 may verify the user through the authentication module 220 using the verification methods discussed above (e.g., single and/or multi-factor authentication methods). Upon successful authentication of the user, the identity provider 120 may provide a number of identity attributes associated with the user to the identity network 105. The identity network 105 may then provide the identity attributes to the identity provider application 215, which may display the identity attributes on a user interface of the user device 115. The user may review the identity attributes and may submit a consent approval on the identity provider application 215 (e.g., responding to a prompt displayed on the identity provider application 215 requesting consent) to provide consent to share the identity attributes with the relying party 110 or may decline such consent. If consent is declined, the process flow halts and nothing further happens, and/or a failure message is sent to the relying party application 205 indicating that the identity provider 120 will not be sharing the identity attributes of the user. When the user provides consent, the identity provider application 215 may provide the consent to the identity network 105.

The identity network 105, upon receiving the consent, may redirect the user device 115 from the identity provider application 215 to a page associated with the relying party application 205. The identity network 105 may also share the identity attributes with the relying party 110. In some embodiments, the identity network 105 may provide the relying party 110 a token that may be used by the relying party 110 to access the identity attributes directly from the identity network 105 (or another database), rather than transmitting the identity attributes to the relying party 110. In some embodiments, the relying party 110 may use this information in a sharing context in which the relying party 110 may utilize and/or store the identity attributes in a newly opened account for the user. For example, the relying party application 205 may use the identity attributes and/or other information to populate the user's information into the relying party application 205 registration form. In some embodiments, the relying party 110 may use the identity attributes in a matching context in which the relying party 110 may compare the identity attributes provided by the identity network 105 and identity provider 120 with identity attributes provided to the relying party 110 by the user to determine whether the identity attributes provided by the user match those provided by the identity network 105. If the relying party 110 determines that the identity attributes match, the relying party 110 may authenticate and verify the identity of the user. If the relying party 110 determines that the identity attributes do not match, the relying party 110 may halt the authentication process and, in some embodiments, notify at least one of the identification network 105 and/or user device 115 that the identity attributes do not match.

In some embodiments, the identity provider 120 and/or identity network 105 may encrypt the identity attributes and any other personal information. For example, the identity network 105 may transmit an encryption key with the session identifier to the relying party application 205 so that the relying party 110 has the key for decrypting the information. While a specific cryptographic key is described, other forms of cryptography and transmission of the cryptographic keys may be used without departing from the scope of the present application including symmetric cryptography, asymmetric cryptography, or any other suitable cryptography that maintains the security of the user's information between the parties.

As described above, during identity attribute sharing and/or matching processes, a user selects a preferred identity provider 120 to provide access to a number of identity attributes to a given relying party 110. The selection of the identity provider 120 by the user may be done in many different ways, using one or more user devices. FIGS. 3A-4C illustrate different techniques for a user to select an identity provider 120 in accordance with embodiments of the present application.

In some embodiments, a user may select an identity provider 120 entirely within an interface application (e.g., a website 150 or a mobile application of any party, such as the relying party 110, identity network 105, or identity provider 120) of a user device 115, such as browser running on a computer, tablet, or smart phone. The user may access a relying party website using the interface application, and may elect to utilize the identity network 105 and/or an identity provider 120 to sign-up for and/or login to an account with the relying party website. For example, FIGS. 3A-B depict an exemplary process for authenticating a user using a single interface application on a device. The user may click interact (e.g., clicking, tapping, or the like) with a page 300A of the interface application to select the identity network 105/identity provider 120 sign-up and/or login process. The page 300A may include a number of icons 320 associated with the identity providers 120 (which may be provided in alphabetical order or any other order) that are enrolled in the identity attribute sharing and/or matching system, as shown in FIG. 3A. Each icon 320 may be associated with a web link (such as a uniform resource locator (URL)) associated with an identity provider 120 such that interacting with the icon 320 may cause the browser to navigate to a login page of the selected identity provider 120.

The user may select one of the identity providers 120 by interacting (with the icon 320 to navigate to an identity provider login page 300B. For example, the user may have interacted with the MyBank icon 320, which may be a web link to navigate to the identity provider login page 300B, as shown in FIG. 3B. The user may enter login credentials associated with the selected identity provider 120 and may be authenticated by the identity provider 120 using the various authentication techniques as described above.

Once the identity provider 120 has authenticated the user's identity, the identity provider 120 may present the user with a number of identity attributes 330, as shown in FIG. 3C. The user may review these identity attributes 330 for accuracy. The identity network 105 may provide a consent request 340 on the confirmation page 300C for consent to share the identity attributes with the relying party 110. The consent request 340 may include a consent icon 341 and a non-consent icon 342. The user may interact with the consent icon 341 to agree to share the identity attributes 330. The user may interact with the non-consent icon 342 to not share the identity attributes 330. Where the user agrees to share the identity attributes 330 (e.g., by interacting with the consent icon 341), the identity attribute 330 may be provided to the relying party 110 and the user may be redirected back to the website of the relying party 110.

In some embodiments, the relying party page of the interface application may include a widget (e.g., as shown in FIG. 3A) that may display the number of identity providers 120 that are enrolled in the identity attribute sharing and/or matching system. The user may interact with the widget to utilize the identity network 105/identity provider 120 to sign-up for and/or login to an account of the relying party 110. Upon opting to use the identity network 105/identity provider 120, the user may be presented with an identity provider selection page that includes some or all available identity providers 120 that are enrolled in the identity attribute sharing and/or matching system. The identity provider selection page accessed using the widget may be hosted by the identity network 105. The identity network 105 may request to store, attempt to store, and/or update a browser cookie indicating which identity provider 120 is selected by the user. For example, the user may select a given one of the identity providers 120, such as by interacting with a logo and/or name of the selected identity provider 120 associated with an interface application. For example, the page may include a website which may cause the browser of the user device to launch and/or navigate to a website associated with the selected identity provider 120. In other embodiments, the page may include an application link, which may cause a mobile application of the selected identity provider 120 to be launched on the user device.

The list of available identity providers 120 may be presented to the user on the interface application in any order. For example, for first time users, the identity providers 120 may be listed in alphabetical order. For non-first time users, the identity provider 120 last selected by the user on the browser of the user device (such as indicated by the stored browser cookie, if present) may be provided at or near a top of the list. If the user selects a different identity provider 120 than the one indicated by the stored browser cookie, the browser cookie may be updated to include the newly selected identity provider 120. In this manner, the next time the identity providers 120 are provided in a list, the newly selected identity provider 120 may be provided at or near a top of the list.

The user may enter login credentials associated with the selected identity provider 120 into the login page of the page. The user may be authenticated by the identity provider 120, which may then provide the user with a number of identity attributes to review prior to requesting the user for consent for the identity provider 120 to share the identity attributes with the relying party 110. The user may then be redirected back to the website and/or mobile application of the relying party 110 after providing consent to share the identity attributes.

In some embodiments, a user may select an identity provider 120 using a combination of platforms on a single device, such as two different mobile applications on a single device and/or a browser and a mobile application on a single device. For example, the user may access a relying party page on a website using a browser and/or using a mobile application. When accessing the relying party page, the user may elect to utilize the identity network 105 and/or an identity provider 120 to sign-up for and/or login to an account with the relying party 110. For example, the user may interact with an icon or some other portion of the relying party page to select the identity network 105/identity provider 120 sign-up and/or login process. The relying party page may display a number of identity providers 120 that are enrolled in the identity attribute sharing and/or matching system. The user may select one of the identity providers 120, such as by interacting with an icon and/or link associated with the identity provider 120. The relying party page may then launch a mobile application associated with the selected identity provider 120. For example, the icon and/or link may include an application link associated with the selected identity provider 120 which may cause the user device to launch a mobile application 215 associated with the selected identity provider 120. If the user device does not already have the mobile application 215 installed, the user device browser may be launched and navigated to a website of the selected identity provider 120 and/or a download location for the mobile application 215 of the selected identity provider 120.

Once launched, the identity provider mobile application 215 may present the user with a login screen with which the user may interact to enter login credentials associated with the selected identity provider 120 for authentication by the identity provider 120. The use of the identity provider mobile application 215 may enable the user to provide user credentials such as a username and/or password to authenticate the user. However, in some embodiments, identity provider mobile application 215 may enable the user to provide a biometric credential, such as a fingerprint scan, retina scan, voice sample, face scan, and the like for authentication by the identity provider 120 and/or locally using the user device. Upon successful authentication, the identity provider mobile application 215 may provide the user with a number of identity attributes to review prior to providing consent for the identity provider 120 to share the identity attributes with the relying party 110. Upon providing consent, the user may then be redirected back to the relying party page.

Figure 4A:
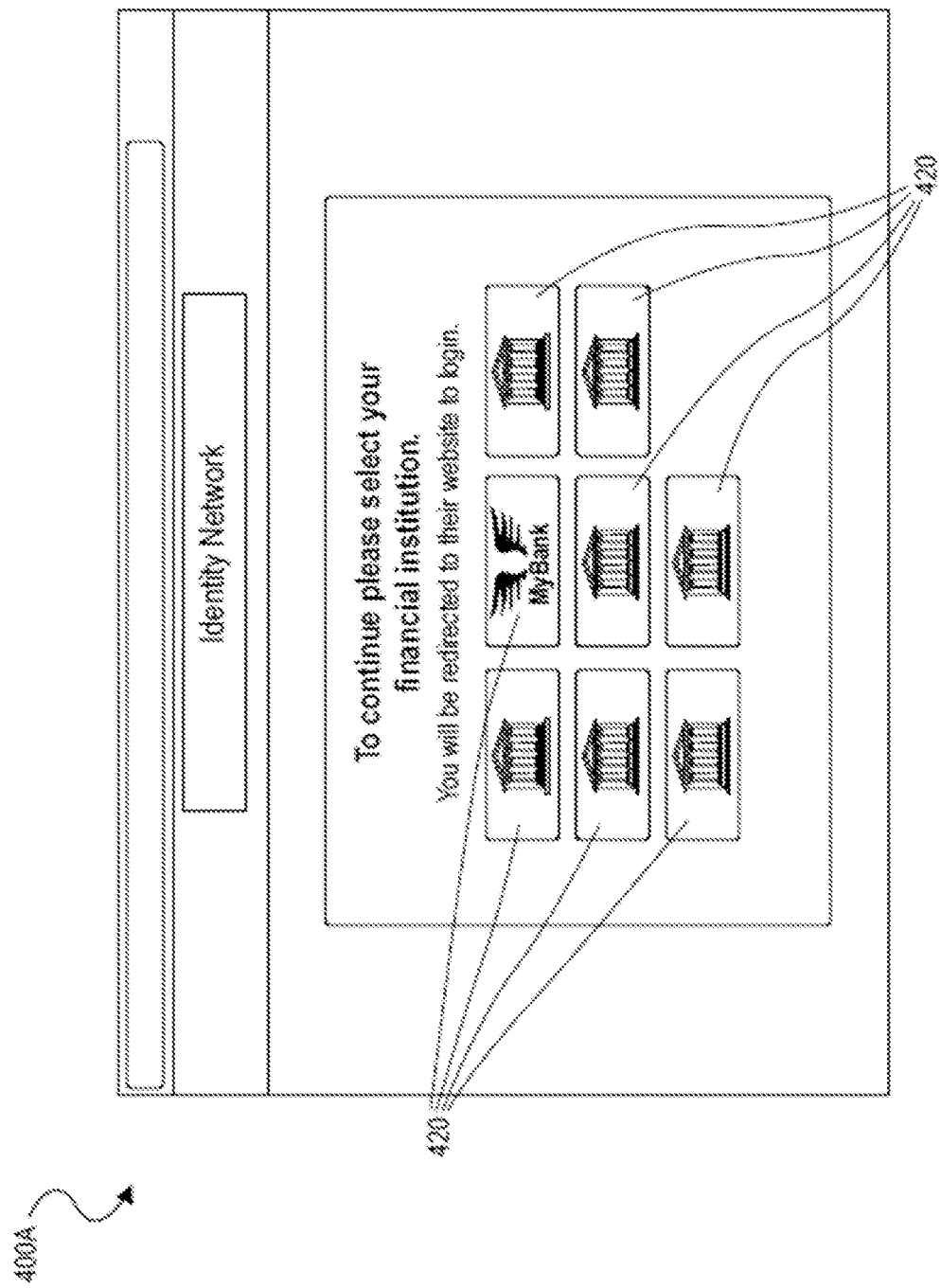
FIGS. 4A-4C illustrate screenshots of a user interface for selecting an identity provider during an identity attribute sharing/matching process according to an embodiment.
Figure 4B:
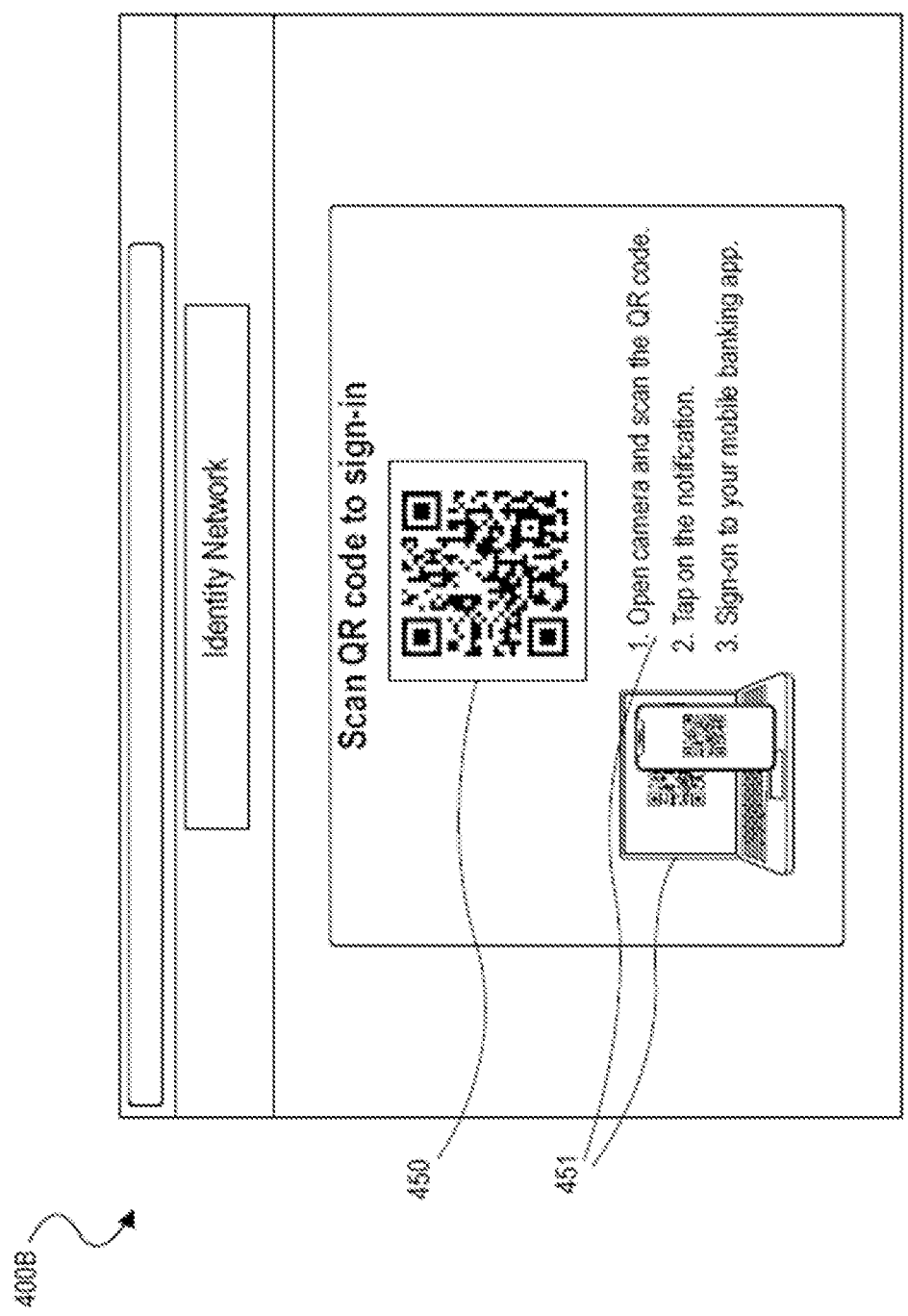
Figure 4C:
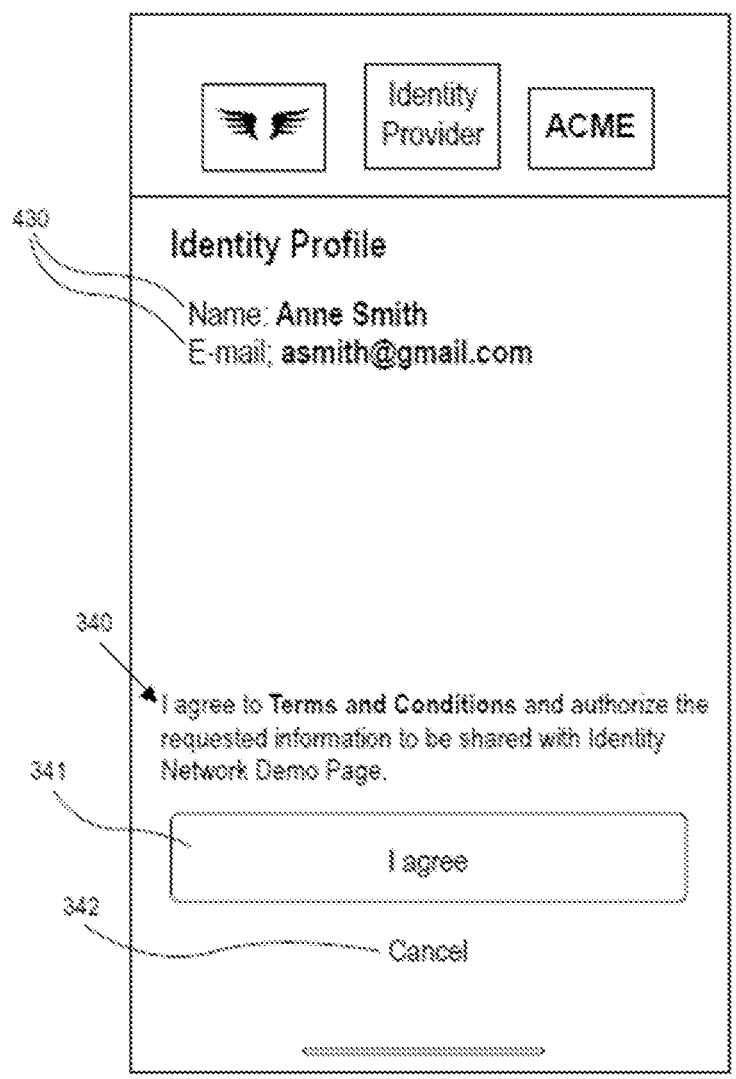

In some embodiments, a user may select an identity provider 120 using a combination of platforms on multiple devices, such as by using a browser and/or mobile application to access a relying party page on a first device (such as a desktop/laptop computer, mobile phone, or tablet computer) and a browser and/or mobile application to access an identity provider page on a second device (such as a different desktop/laptop computer, mobile phone, or tablet computer). For example, FIGS. 4A-C depict an exemplary process for authenticating a user using multiple devices. The user may access a relying party page (not shown) on an interface application using a page associated with the relying party 110. When accessing the relying party page, the user may elect to utilize the identity network 105 and/or an identity provider 120 to sign-up for and/or login to an account with the relying party. For example, the user may click on an icon and/or otherwise interact with the relying party page to initiate the identity network 105/identity provider 120 sign-up and/or login process. Turning to FIG. 4A, the relying party page may redirect the user device to a page 400A that includes a number of icons 420 associated with identity providers 120 that are enrolled in the identity attribute sharing and/or matching system. The user may select one of the identity providers 120 by interacting with an icon 420 associated with the identity provider 120.

Turning to FIG. 4B, if the selected identity provider 120 has integrated a mobile software development kit (mSDK) into a mobile application, the user may be directed to a page 400B including a quick response (QR) code 450. In some embodiments, instructions 451 regarding how to use the QR code may be presented along with the QR code. The user may be prompted to open another application to scan the QR code. In some embodiments, the user may open a mobile application associated with the selected identity provider 120. For example, the user may launch and login to the mobile application associated with the selected identity provider 120 on the second user device. The user may then navigate to an identity network page of the mobile application and selecting an option to use a QR code. Alternatively, the mobile application may launch a camera, which the user may use to capture an image of the QR code 450 shown on the page 400B on the first computing device.

Turning to FIG. 4C, once the QR code has been captured, the user may be directed to a confirmation page 400C showing a number of identity attributes 430 for a user to review. The user may review the identity attributes and may provide consent for the identity network 105 to share the identity attributes with the relying party 110. However, in some embodiments, the identity provider 120 may directly share the identity attributes with the relying party 110. The user may then be redirected back to the relying party page and the identity attributes 430 may be shared with the relying party 110.

In other embodiments, rather than using the camera within the identity provider mobile application, the user may launch a native camera of the second user device and image the QR code 450. Upon imaging the QR code 450, the QR code may cause the second user device to launch the mobile application of the selected identity provider 120. The user may login to the mobile application associated with the selected identity provider 120 on the second user device to access a confirmation page 400C of a number of identity attributes 430, review a number of identity attributes 430, and provide consent for the identity provider 120 to share the identity attributes with the relying party 110. The user may then be redirected back to the relying party page and the identity attributes may be shared with the relying party 110.

While the identity provider selection techniques described above are described separately, it will be appreciated that a given relying party 110 and/or identity provider 120 may support multiple types of identity provider selection techniques in various embodiments. For example, a user may have the option of using a web link (such as a URL) to open a website of an identity provider 120 on a browser of a user device, an application link to open a login page of a mobile application of the identity provider 120, and/or to use a QR code to launch a mobile application and/or a consent page of a mobile application or website of the identity provider 120 on a second device. Some identity providers 120 may not support all forms of selection. For example, some identity providers 120 may not support QR codes and/or data sharing/matching. In some embodiments, if an identity provider 120 does not support QR codes and/or data sharing/matching the identity provider 120 may not be included in the identity provider selection page to ensure that users are not prompted to select an identity provider that is not enrolled for use in the identity attribute sharing system and/or function thereof.

Figure 5:
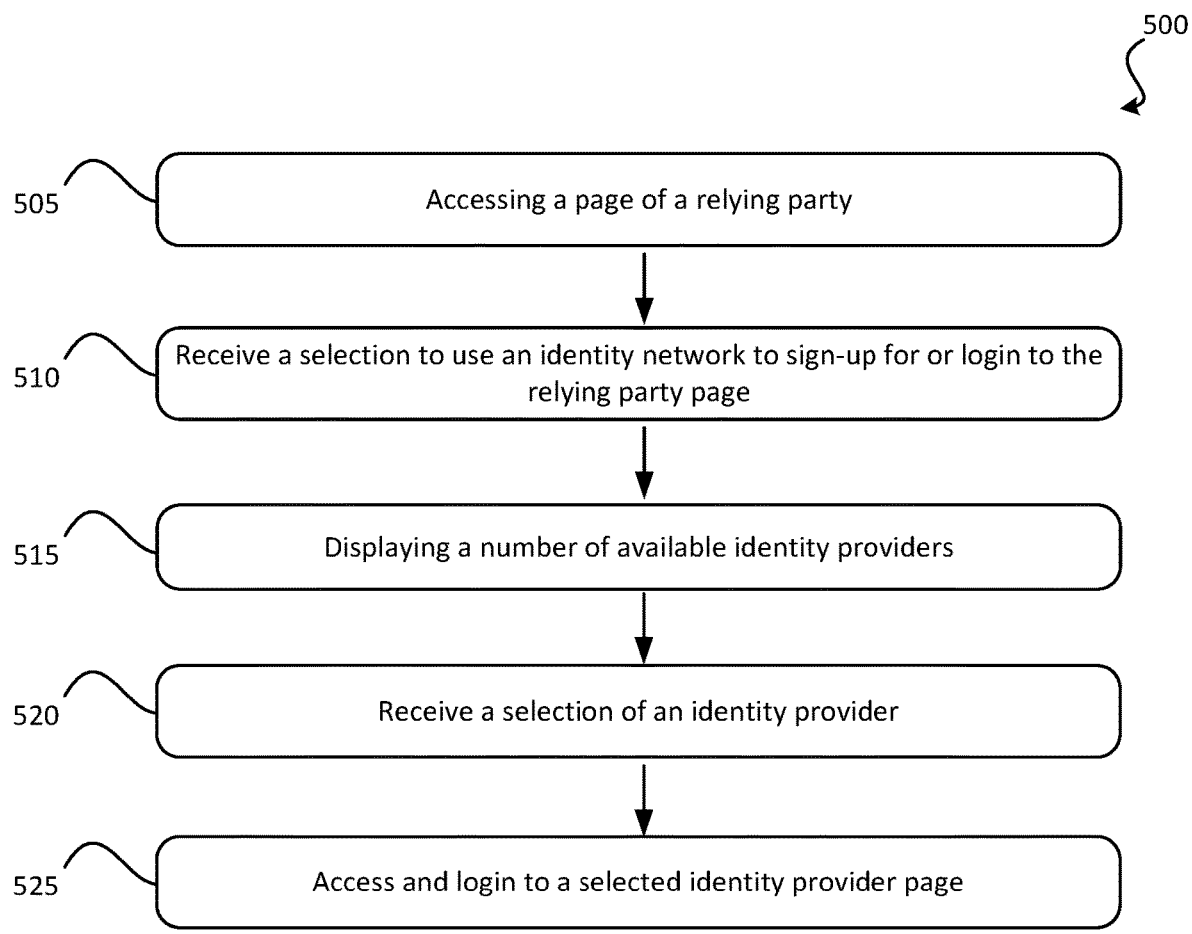
FIG. 5 illustrates an example method for selecting an identity provider as part of an identity attribute sharing/matching process according to an embodiment.

FIG. 5 illustrates a method 500 of selecting an identity provider for identity attribute sharing and/or matching according to embodiments of the present application. Although the method below is performed using a user device, in other embodiments, the method 500 may be performed using an identity network 105, identity provider 120, and/or relying party 110.

Method 500 may begin at operation 505 by a user accessing, by a user device, a page of a relying party. This may include navigating to a sign-up and/or login page of a relying party website and/or mobile application.

At operation 510, the user device may receive a user selection to utilize an identity network to share a number of identity attributes with the relying party. In particular, the user may elect to use the identity network 105 and/or an identity provider 120 for signing-up for and/or logging into an account with the relying party 110. For example, the user may interact with an icon or link on the relying party page to opt into using the identity network 105 and/or an identity provider 120.

At operation 515, the user device may display a plurality of identity providers enrolled for use with the identity attribute sharing system. In this operation, the user may be presented with a number of possible identity providers that are enrolled in the identity attribute sharing/matching system on a user interface of the user device at operation 515. This may include icons 320, 420 associated with identity providers 120 as shown on identity network pages 300A, 400A.

At operation 520, the user device may receive a selection of one of the plurality of identity providers. In particular, the user may select one of the identity providers 120 from the list. For example, the user may interact with one of the icons 320, 420.

At operation 525, the user may then be provided access, by the user device, to a page of a selected identity provider. Specifically, the user may access one of an identity provider page 300B, 300C, 400C. The user may log into a mobile application and/or website of the selected identity provider 120 at operation 525 (e.g., page 300B, as shown in FIG. 3B). This may be done in several ways, such as those described above. For example, the user may select a web link that launches and/or navigates a browser of the user device to a login page of the selected identity provider 120. In other embodiments, the user may select an application link that launches a mobile application associated with the selected identity provider 120. In other embodiments, the user may use a different user device to image a QR code presented on a screen of the relying party page, which may launch and/or navigate a mobile application of the selected identity provider 120 to a login and/or identity attribute page that is displayed on the different user device.

Once a user has logged into the identity provider 120 website and/or mobile application, the user may be presented with a list of identity attributes to be shared with the relying party 110. For example, this may include identity attributes 330, 430. The user may review the identity attributes. The user may provide consent to share the identity attributes by interacting with a portion of that page (e.g., with a consent request 340, 440). The identity attributes may be shared with the relying party upon the consent of the user, and the user may be redirected to relying party page to complete sign-up/login and/or to otherwise use relying party page.

FIG. 6 illustrates a block diagram of an example computer system 600 usable for performing image analysis, normalization, and display. The computing device 600 can be or include, for example, a laptop computer, desktop computer, tablet, e-reader, smart phone or mobile device, smart watch, personal data assistant (PDA), or other electronic device.

The computing device 600 can include a processor 640 interfaced with other hardware via a bus 605. A memory 610, which can include any suitable tangible (and non-transitory) computer readable medium, such as RAM, ROM, EEPROM, or the like. The memory 610 may include embody program components (e.g., instructions 615) that configure operation of the computing device 600. In some examples, the computing device 600 can include input/output ("I/O") interface components 625 (e.g., for interfacing with a display 645, keyboard, or mouse) and additional storage 630.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

The computing device 600 may include a sensor 655. This may include a camera to capture images, microphone to record noises, a haptic sensor to detect pressure, or a biometric sensor to detect various biometric measurements (e.g., a fingerprint, heart rate, or the like).

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

Each of the instructions, calculations, or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. The instructions or operations may be stored in the non-transitory memory or memory device and executed by the processor, which causes the processor to perform the instructions or operations described.

Different arrangements of the components depicted in the drawings or described above, as well as components and steps not shown or described are possible. Similarly, some features and sub-combinations are useful and may be employed without reference to other features and sub-combinations. Embodiments of the present application have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the present application, a single component may be replaced by multiple components, and multiple components may be replaced by a single component, to provide an element or structure or to perform a given function or functions. Except where such substitution would not be operative to practice certain embodiments of the present application, such substitution is considered within the scope of the present application.

It is to be understood that the figures and descriptions of embodiments of the present application have been simplified to illustrate elements that are relevant for a clear understanding of the present application. Those of ordinary skill in the art will recognize, however, that these and other elements may be desirable. However, because such elements are well known in the art, and because they do not facilitate a better understanding of the present application, a discussion of such elements is not provided herein. It should be appreciated that the figures are presented for illustrative purposes and not as construction drawings. Omitted details and modifications or alternative embodiments are within the purview of persons of ordinary skill in the art.

The examples presented herein are intended to illustrate potential and specific implementations of the present application. It can be appreciated that the examples are intended primarily for purposes of illustration of the present application for those skilled in the art. There may be variations to these diagrams or the operations described herein without departing from the spirit of the present application. For instance, in certain cases, method steps or operations may be performed or executed in differing order, or operations may be added, deleted, or modified.

Furthermore, whereas particular embodiments of the present application have been described herein for the purpose of illustrating the present application and not for the purpose of limiting the same, it will be appreciated by those of ordinary skill in the art that numerous variations of the details, materials and arrangement of elements, steps, structures, and/or parts may be made within the principle and scope of the present application without departing from the present application as described in the claims.

All patents, patent publications, patent applications, journal articles, books, technical references, and the like discussed in the instant disclosure are incorporated herein by reference in their entirety for all purposes.

What is claimed is:

1. A method of authenticating an identity of a user, the method comprising:
   receiving, by a relying party computing device from a user device associated with the user, an identity assertion associated with the user to access an access-controlled portion of a website of a relying party associated with the relying party computing device;
   receiving, by the relying party computing device from the user device, a first set of identity attributes associated with the identity of the user;
   receiving, by the relying party computing device from an identity network computing device, based at least in part on an authentication of the identity of the user by an identity provider computing device, a second set of identity attributes associated with the identity of the user;
   comparing, by the relying party computing device, the first set of identity attributes and second set of identity attributes to determine whether to provide access to the user device to the access-controlled portion of the website; and
   if the first set of identity attributes and second sets of identity attributes match, providing, by the relying party computing device to the user device, access to the access-controlled portion of the website of the relying party.

2. The method of claim 1,
   further comprising requesting particular identity attributes from the identity network; and
   wherein receiving the second set of identity attributes includes receiving the particular identity attributes.

3. The method of claim 1,
   wherein the first set of identity attributes were received prior to the second set of identity attributes; and
   the method further comprises storing the second set of identity attributes.

4. The method of claim 1, wherein, if the first set of identity attributes and second set of identity attributes do not match, the relying party denies access to the user device to the access-controlled portion of the website of the relying party.

5. The method of claim 4,
wherein the first set of identity attributes were entered in a set of data fields;
the method further comprises:
identifying one or more data fields of the set of data fields include identity attributes that do not match the second set of identity attributes;
receiving a third set of identity attributes entered by the user including changes to an entry of the one or more data fields; and
comparing the second set of identity attributes and third set of identity attributes to determine whether to provide access to the user device to the access-controlled portion of the website.

6. A non-transitory computing-device readable storage medium on which computing-device readable instructions of a program are stored, the instructions, when executed by one or more processors of a relying party computing device, cause the relying party computing device to perform a method, comprising:
receiving, by the relying party computing device from a user device associated with the user, an identity assertion associated with a user to access an access-controlled portion of a website of a relying party associated with the relying party computing device;
receiving, by the relying party computing device from the user device, a first set of identity attributes associated with the identity of the user;
receiving, by the relying party computing device from an identity network computing device, based at least in part on an authentication of the identity of the user by an identity provider computing device, a second set of identity attributes associated with the identity of the user;
comparing, by the relying party computing device, the first set of identity attributes and second set of identity attributes to determine whether to provide access to the user device to the access-controlled portion of the website; and
if the first set of identity attributes and second sets of identity attributes match, providing, by the relying party computing device to the user device, access to the access-controlled portion of the website of the relying party.

7. The method non-transitory computing-device readable storage medium of claim 6,
further comprising additional computer-executable instructions that, when executed by the one or more processors, cause the relying party computing device to request particular identity attributes from the identity network; and
wherein receiving the second set of identity attributes includes receiving the particular identity attributes.

8. The non-transitory computing-device readable storage medium of claim 6,
wherein the first set of identity attributes were received prior to the second set of identity attributes; and
the non-transitory computing-device readable storage medium further comprises additional computer-executable instructions that, when executed by the one or more processors, cause the relying party computing device to store the second set of identity attributes.

9. The method non-transitory computing-device readable storage medium of claim 6, wherein, if the first set of identity attributes and second set of identity attributes do not match, the relying party denies access to the user device to the access-controlled portion of the website of the relying party.

10. The non-transitory computing-device readable storage medium of claim 9,
wherein the first set of identity attributes were entered in a set of data fields;
the non-transitory computing-device readable storage medium further comprises additional computer-executable instructions that, when executed by the one or more processors, cause the relying party computing device to:
identify one or more data fields of the set of data fields include identity attributes that do not match the second set of identity attributes;
receive a third set of identity attributes entered by the user including changes to an entry of the one or more data fields; and
compare the second set of identity attributes and third set of identity attributes to determine whether to provide access to the user device to the access-controlled portion of the website.

11. A relying party computing device comprising:
a memory comprising computer-executable instructions; and
a processor configured to access the memory and execute the computer-executable instructions to perform operations comprising:
receive, by the relying party computing device from a user device associated with the user, an identity assertion associated with a user to access an access-controlled portion of a website of a relying party associated with the relying party computing device;
receive, by the relying party computing device from the user device, a first set of identity attributes associated with the identity of the user;
receive, by the relying party computing device from an identity network computing device, based at least in part on an authentication of the identity of the user by an identity provider computing device, a second set of identity attributes associated with the identity of the user;
compare, by the relying party computing device, the first set of identity attributes and second set of identity attributes to determine whether to provide access to the user device to the access-controlled portion of the website; and
if the first set of identity attributes and second sets of identity attributes match, provide, by the relying party computing device to the user device, access to the access-controlled portion of the website of the relying party.

12. The relying party computing device of claim 11,
the memory comprises additional computer-executable instructions and the processor is further configured to request particular identity attributes from the identity network; and
wherein receiving the second set of identity attributes includes receiving the particular identity attributes.

13. The relying party computing device of claim 11, wherein, if the first set of identity attributes and second set of identity attributes do not match, the relying party denies access to the user device to the access-controlled portion of the website of the relying party.

14. The relying party computing device of claim 13,
wherein the first set of identity attributes were entered in a set of data fields;
the relying party computing device further comprises the memory comprises additional computer-executable instructions and the processor is further configured to:
identify one or more data fields of the set of data fields include identity attributes that do not match the second set of identity attributes;
receive a third set of identity attributes entered by the user including changes to an entry of the one or more data fields; and
compare the second set of identity attributes and third set of identity attributes to determine whether to provide access to the user device to the access-controlled portion of the website.

\* \* \* \* \*